(12) United States Patent
Liu et al.

(10) Patent No.: US 6,922,754 B2
(45) Date of Patent: Jul. 26, 2005

(54) DATA-AWARE DATA FLOW MANAGER

(75) Inventors: Wei Liu, Bellevue, WA (US); Steven H. Kahle, Edmonds, WA (US)

(73) Assignee: inFabric Technologies, Inc., Edmonds, WA (US)

( * ) Notice: Subject to any disclaimer, the term of this patent is extended or adjusted under 35 U.S.C. 154(b) by 0 days.

(21) Appl. No.: 10/730,383

(22) Filed: Dec. 8, 2003

(65) Prior Publication Data

US 2004/0117441 A1 Jun. 17, 2004

Related U.S. Application Data

(60) Provisional application No. 60/431,531, filed on Dec. 9, 2002.

(51) Int. Cl.[7] .............................................. G06F 12/12
(52) U.S. Cl. ...................... 711/138; 711/134; 711/133; 711/135
(58) Field of Search ................................ 711/118, 133, 711/134, 135, 136, 138, 139, 159

(56) References Cited

U.S. PATENT DOCUMENTS

| | | | |
|---|---|---|---|
| 5,394,531 A | * | 2/1995 | Smith .......................... 711/136 |
| 5,432,919 A | * | 7/1995 | Falcone et al. ............. 711/134 |
| 5,483,640 A | | 1/1996 | Isfeld et al. |
| 5,559,985 A | * | 9/1996 | Maemura .................... 711/140 |
| 5,590,349 A | | 12/1996 | Robinson et al. |
| 5,615,392 A | | 3/1997 | Harrison et al. |
| 5,619,642 A | | 4/1997 | Nielson et al. |
| 5,625,793 A | * | 4/1997 | Mirza .......................... 711/138 |
| 5,724,501 A | | 3/1998 | Dewey et al. |
| 5,729,713 A | * | 3/1998 | Leyrer ......................... 711/138 |
| 5,732,240 A | * | 3/1998 | Caccavale ................... 711/118 |
| 5,787,431 A | | 7/1998 | Shaughnessy |
| 5,809,533 A | | 9/1998 | Tran et al. |
| 5,860,105 A | | 1/1999 | McDermott et al. |
| 5,864,607 A | | 1/1999 | Rosen et al. |
| 5,892,937 A | * | 4/1999 | Caccavale ................... 711/135 |
| 5,895,485 A | * | 4/1999 | Loechel et al. ............. 711/119 |

(Continued)

FOREIGN PATENT DOCUMENTS

| | | |
|---|---|---|
| EP | 0348616 | 4/1989 |
| EP | 0348628 | 4/1989 |
| EP | 0530310 | 11/1991 |
| EP | 0930718 | 7/1999 |
| JP | 2000047912 | 2/2000 |

OTHER PUBLICATIONS

Chen et al., "The Application of Two–Level Cache in RAID System", Proceedings of the 4th WCICA, 2002, pp. 1328–1332, vol. 2 Shanghai, China.*
Wong et al., "Modified LRU Policies for Improving Second–level Cache Behavior", 6th International Symposium on High–Performance Computer Architecture, Jan. 8–12, 2000, p. 49: Toulouse, France.*
Megiddo et al., "ARC: A Self–Tuning, Low Overhead Replacement Cache", USENIX File and Storage Technologies (FAST), Mar. 31, 2003 San Francisco, CA.*
Megiddo et al., "One Up on LRU", The Magazine of the USENIX Association, vol. 28, No. 4, pp. 7–11, Aug., 2003.*
Karedla et al., "Caching Strategies to Improve Disk System Performance", Computer, pp. 38–46, Mar. 1994.*

*Primary Examiner*—B. James Peikari
(74) *Attorney, Agent, or Firm*—John S. Jardine

(57) ABSTRACT

A method and system directed to reducing the bottleneck to storage. In one aspect of the invention, a data-aware data flow manager is inserted between storage and a process or device requesting access to the storage. The data-aware data flow manager determines which data to cache and which data to pipe directly through. Through intelligent management and caching of data flow, the data-aware data flow manager is able to avoiding some of the latencies associated with caches that front storage devices. The data-aware data flow manager may determine whether to cache data or pipe it directly through based on many factors including type of data requested, state of cache, and user or system policies.

28 Claims, 9 Drawing Sheets

U.S. PATENT DOCUMENTS

| | | | | |
|---|---|---|---|---|
| 5,895,488 | A | 4/1999 | Loechel | |
| 5,898,863 | A | 4/1999 | Ofer et al. | |
| 5,905,854 | A | 5/1999 | Nielson et al. | |
| 5,958,068 | A * | 9/1999 | Arimilli et al. | 714/8 |
| 6,003,114 | A | 12/1999 | Bachmat | |
| 6,018,763 | A | 1/2000 | Hughes et al. | |
| 6,141,728 | A | 10/2000 | Simionescu et al. | |
| 6,243,795 | B1 * | 6/2001 | Yang et al. | 711/159 |
| 6,266,666 | B1 | 7/2001 | Ireland et al. | |
| 6,275,866 | B1 | 8/2001 | Boulia et al. | |
| 6,279,050 | B1 | 8/2001 | Chilton et al. | |
| 6,301,625 | B1 | 10/2001 | McDonald et al. | |
| 6,317,805 | B1 | 11/2001 | Chilton et al. | |
| 6,341,331 | B1 * | 1/2002 | McNutt | 711/113 |
| 6,389,555 | B2 | 5/2002 | Purcell et al. | |
| 6,397,273 | B2 | 5/2002 | Chilton | |
| 6,418,488 | B1 | 7/2002 | Chilton et al. | |
| 6,457,102 | B1 | 9/2002 | Lambright et al. | |
| 6,484,234 | B1 | 11/2002 | Kedem | |
| 6,487,562 | B1 | 11/2002 | Mason, Jr. et al. | |
| 6,496,908 | B1 | 12/2002 | Kamvysselis et al. | |
| 6,513,102 | B2 | 1/2003 | Garrett et al. | |
| 6,516,390 | B1 * | 2/2003 | Chilton et al. | 711/138 |
| 6,529,998 | B1 | 3/2003 | Yochai et al. | |
| 6,567,975 | B1 | 5/2003 | Damron | |
| 6,574,682 | B1 | 6/2003 | Chan | |
| 6,594,742 | B1 | 7/2003 | Ezra | |
| 6,609,177 | B1 * | 8/2003 | Schlumberger et al. | 711/122 |
| 6,629,211 | B2 * | 9/2003 | McKnight et al. | 711/141 |
| 6,633,902 | B1 | 10/2003 | Asano et al. | |
| 6,742,084 | B1 * | 5/2004 | Defouw et al. | 711/133 |
| 6,748,492 | B1 * | 6/2004 | Rowlands et al. | 711/128 |
| 2002/0087746 | A1 | 7/2002 | Ludtke et al. | |

* cited by examiner

DATA-AWARE DATA FLOW MANAGER

CROSS-REFERENCE TO RELATED APPLICATION

This application claims the benefit of U.S. Provisional Application Ser. No. 60/431,531, filed Dec. 9, 2002, entitled METHOD AND APPARATUS FOR DATA-AWARE DATA FLOW MANAGEMENT IN NETWORKED STORAGE SYSTEMS, which application is incorporated herein in its entirety.

FIELD OF THE INVENTION

This application relates generally to computers, and more specifically to data flow management.

BACKGROUND

The size of mass storage continues to grow at a phenomenal rate. At the same time, the data that is stored on mass storage devices also continues to grow. Many applications are designed to take advantage of this expanded storage and often install files that would have consumed hard drives of only a few years ago. Data centers also have found ways to use the increased storage capacity. Databases on the order of terabytes are common while databases of much larger sizes are also increasing in number. Quickly moving data between storage devices and applications has become a challenge for both personal and enterprise applications.

Hardware developers have responded by developing faster hard drives, larger hard drive caches, and more bandwidth between storage devices and CPUs. Despite the dazzling increase in performance, storing or retrieving data or code from a hard drive remains one of the most significant bottlenecks to increased performance. What is needed is a method and system to speed the transfer of data and code to both local and remote storage.

SUMMARY

Briefly, the present invention provides a method and system directed to reducing the bottleneck to storage. In one aspect of the invention, a data-aware data flow manager (DADFM) is inserted between storage and a process or device requesting access to the storage. In another aspect of the invention, an already-existing data cache is moved out of the direct data paths and supplemented with one or more components of a DADFM. The data-aware data flow manager determines which data to cache and which data to pipe directly through. Through intelligent management and caching of data flow, the data-aware data flow manager is able to avoid some of the latencies associated with caches that front storage devices. The data-aware data flow manager may determine whether to cache data or pipe it directly through based on many factors including type of data requested, state of cache, state of I/O components, and user or system policies.

In an aspect of the invention, the data-aware data flow manager provides a mechanism for flushing the cache to avoid or alleviate cache stress conditions. The mechanism may involve one or more of monitoring clean and dirty lines within the cache, pacing the flush, flushing the cache during relatively idle times or when the stress on the cache exceeds a threshold, avoiding flush during certain read requests, eliminating the need of reads waiting for a flush and read-induced writes, routing data directly through while bypassing the cache, or taking other measures to improve the performance of the system.

In another aspect of the invention, the data-aware data flow manager provides a mechanism for switching cache write policies dynamically in order to alleviate a cache or storage system stress condition. The mechanism may involve one or more of examining data access characteristics, state of cache, state of I/O components or other factors, dynamically choosing write through, write back, write invalidate, routing data directly through while bypassing the cache, or taking other measures to improve the performance of the system.

In another aspect of the invention, the data-aware data flow manager attempts to predict data access patterns. Using these predictions, the data-aware data flow manager attempts to obtain data before it is requested, readjust I/O transfer sizes to accommodate for an unusual pattern of reads or writes, or take other actions.

In another aspect of the invention, the data-aware data flow manager attempts to group writes together. The data-aware data flow manager may cache writes until a pre-defined amount of data is available to write altogether. Similarly, the data-aware data flow manager may read more data from storage than was requested by a server. The extra data may be cached in a memory of the data-aware data flow manager in anticipation of future read requests from the server.

DADFMs may be implemented in one or more places along a data path to increase performance. In some embodiments of the invention, the DADFM is incorporated on a network appliance that sits between a mass storage device and a device that requests access to the data on the storage device. In other embodiments of the invention, the DADFM is implemented on one or more devices that request data. In these other embodiments, components of the DADFM may reside, for example, in an output driver layer of an operating system or an application executing on the device and may use system memory as cache.

In other embodiments of the invention, a DADFM may be implemented using a host bus adapter or RAID card and may use host memory or card memory, respectively, as cache. Traditional RAID cards typically have at least one microprocessor, an operating system, and some access to system resources. Other RAID controllers are implemented on a single chip that includes its own cache and one or more microprocessors. The resources of either type of RAID controller may be used to implement a DADFM to speed throughput to and from storage managed by the RAID controller.

A Network Attached Storage device (NAS) gives Local Area Network (LAN) access to a file server that manages mass storage. A DADFM may be implemented using the components of a NAS product, which is essentially a computer with an operating system and memory, to deliver better performance. Switches in network fabric may include a microprocessor and memory. A DADFM may be implemented using the components of a switch to increase performance, particularly as the capabilities of fabric switches increases.

In one aspect of the invention, the DADFM may receive input from a content manager module. The input may indicate the type of content contained in a data access and may take the form of XML tags or a type of meta-data or other embedded flags or data. This input may be considered in addition to other information about the data to determine the data flow and caching strategy for the data being accessed. In this manner the DADFM may become a "content aware" data flow manager.

Similarly, in another aspect of the invention, the DADFM may receive input from an application manager module. The input may identify an application associated with an access request. The application manager module may use filename extensions, other file attributes, meta-data associate with a file, data tags, or other information about the data access to determine the application requesting the data access. Alternatively, or in addition, the application manager module may interact directly with the application to determine the application requesting the data access. The DADFM may use this input together with other information to determine the data flow and caching strategy to use for the data being accessed. In this manner, the DADFM may become an "application aware" data flow manager.

Other aspects of the invention will become apparent from the following detailed description when taken in conjunction with the drawings, in which:

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments can be utilized, and other changes can be made, without departing from the spirit or scope of the present invention. The following detailed description is, therefore, not to be taken in a limiting sense, and the scope of the present invention is defined by the appended claims.

Throughout the specification and claims, the following terms take the meanings explicitly associated herein, unless the context clearly dictates otherwise.

The term "or" is an inclusive "or" operator, and is equivalent to the term "and/or", unless the context clearly dictates otherwise.

The term "based on" is not exclusive and allows for being based on additional factors not described, unless the context clearly dictates otherwise.

The term "network" includes any method or medium for transmitting information from one device to another, unless the context clearly dictates otherwise. A network may interconnect computer devices and storage devices and switches, routers or hubs (sometimes referred to as a storage area network). A network may interconnect devices that are relatively local to each other (sometimes referred to as a local area network), devices that are relatively spread out with respect to each other (sometimes referred to as a wide area network), or some combination thereof. A network may include wired or wireless communication links. A widely recognized network is the Internet which connects millions of devices around the world.

Figure 1:
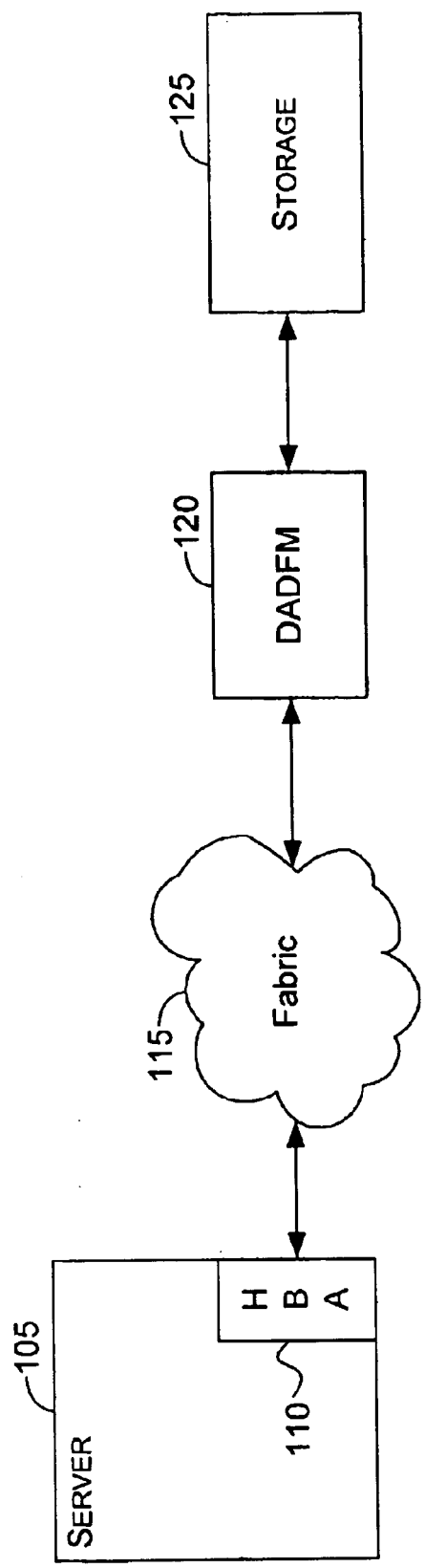
FIG. 1 is a block diagram representing an exemplary environment in which the invention may be practiced in accordance with some aspects of the invention.

FIG. 1 is a block diagram representing an exemplary environment in which the invention may be practiced in accordance with some aspects of the invention. The environment includes server 105, fabric 115, data-aware data flow manager 120 and storage 125. The devices shown in the environment are interconnected by a network having communication links. In some embodiments of the invention, data-aware data flow manager 120 is incorporated in server 105, fabric 115, or storage 125. In other embodiments of the invention, data-aware data flow manager 120 and storage 125 are incorporated in server 105. Data-aware data flow manager 120 may be incorporated at multiple places within the environment. For example, data-aware data flow manager 120 may be incorporated on server 105 or storage 125 in addition to, or alternatively from, being inserted between fabric 115 and storage 125.

The communication links shown represent any medium capable of transmitting information. In some embodiments of the invention, one or more communication links are fiber channels—especially those that need a lot of bandwidth. It will be recognized, however, that any type of communication link may be used without departing from the spirit or scope of the invention.

Server 105 comprises a device or process that provides services. In general, server 105 receives requests from one or more clients and performs a service for the requesting client. Server 105 may, for example, provide Web pages, files, database access, audio or video streams, electronic messages, or other services for clients. At times, server 105 may also take on one or more roles of a client in requesting data or services from another wired or wireless device. Server 105 includes one or more host bus adapters 110. Each host bus adapter 110 provides an interface to a communication link for communicating with other devices (e.g., storage 125 via fabric 115 and data-aware data flow manager 120).

Server 105 may include an operating system and memory. Server 105 may use part of its memory as a cache. This may be done, for example, in an attempt to avoid the latencies involved with sending data to or requesting data from storage 125. When the cache includes the data requested, a data read may be accomplished much faster than going to storage 125.

Fabric 115 represents a network connecting server 105 and data-aware data flow manager 120. It should be understood that fabric 115 may include routers, switches, or other devices (not shown) for routing data between server 105 and data-aware data flow manager 120. Fabric 115 may also be connected to and provide access to other devices (not shown). In some embodiments of the invention, fabric 115 is not included; rather, server 105 either includes the storage or is directly connected to the storage through a communication link.

Data-aware data flow manager 120 is a device or process that intelligently caches or does not cache data, depending on a variety of factors which are described in more detail below. Briefly, when data-aware data flow manager 120 receives data that needs to be written to storage 125 or data that has been retrieved from storage 125, data-aware data flow manager 120 may decide to cache the data or send the data through without caching the data.

Data-aware data flow manager 120 may be constructed to appear as a storage device to server 105 and as a server to storage 125. That is, when server 105 sends a request to store data, data-aware data flow manager 120 may store the data in its own memory or other storage and inform server 105 that the data has been stored. Server 105 will typically not know that the data has not been stored to storage 125; rather, it thinks, based on the reply from data-aware data flow manager 120, that the data has been stored in storage 125. Similarly, in responding to a request there may be little or no different (from storage 125's perspective) between interacting with data-aware data flow manager 120 or server 105. In fact, based on the flow of information, storage 125 might not know that it is interacting with data-aware data flow manager 120 instead of server 105. The feature of being transparent allows data-aware data flow manager 120 to be inserted essentially anywhere between server 105 and storage 125—even if server 105 and storage 125 reside in the same device, for example.

Storage 125 includes any computer-readable media which stores data. Computer storage media can include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device. Most commonly, storage 125 will be some sort of mass storage device, such as one or more hard disk drives.

In data center implementations, storage 125 may be configured, for example, as a redundant array of inexpensive disks (RAID) which include a controller, as just a bunch of disks (JBOD), or in some other configuration. In implementations in which the storage is included in server 105, storage 125 may comprise one or more hard drives. It will be recognized that the type of storage 125 may vary depending on application without departing from the spirit or scope of the present invention.

Each computing device mentioned herein (e.g., server 105, data-aware data flow manager 120, and the like) may be implemented on or by any device capable of executing instructions. Such devices may include, for example, computers, network appliances, multiprocessor systems, microprocessor-based or programmable consumer electronics, network PCs, cell phones, smart phones, pagers, radio frequency (RF) devices, infrared (IR) devices, CBs, personal digital assistants (PDAs), POCKET PCs, wearable computers, integrated devices combining one or more of the preceding devices, embedded microprocessors, and the like.

Figure 2:
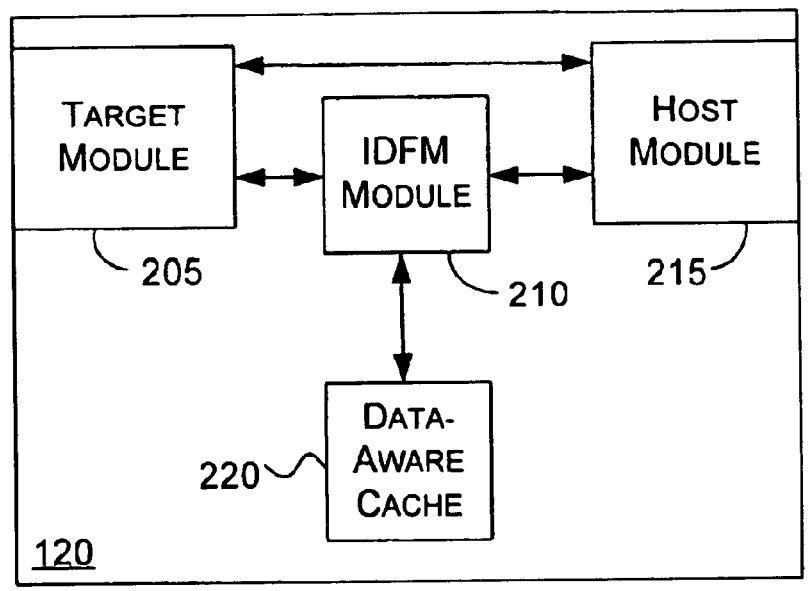
FIG. 2 is a block diagram illustrating a more detailed view of a data-aware data flow manager in accordance with some aspects of the invention.

FIG. 2 is a block diagram representing a more detailed view of a data-aware data flow manager in accordance with some aspects of the invention. Data-aware data flow manager 120 includes target module 205, intelligent data flow manager (IDFM) module 210, host module 215, and data-aware cache 220.

Target module 205 includes logic and protocols needed to make data-aware data flow manager 120 appear as a target device. Thus, a server (not shown) having a host bus adapter can communicate with data-aware data flow manager 120 via target module 205 as if data-aware data flow manager 120 were a storage device. Typically, a target module acts as an interface to a requestor.

Similarly, host module 215 includes logic and protocols needed to make data-aware data flow manager 120 appear as a host device. Thus, data-aware data flow manager 120 can communicate with a storage device (or other downstream device) as if data-aware data flow manager 120 were a host device. Typically, a host module acts as an interface to a storage device (or other downstream device).

IDFM module 210 is used to make various decisions with respect to data passing through data-aware data flow manager 120. Among its tasks, IDFM module 210 determines whether data should be piped directly through data-aware data flow manager 120 (e.g., directly from target module 205 to host module 215), or whether the data should be cached in data-aware cache 220. As this is described in more detail below, this decision making will not be described in more detail here.

Data-aware cache 220 stores and retrieves data in accordance with instructions from IDFM module 210. Data-aware cache 220 may be implemented in any type of memory, volatile or non-volatile.

Data-aware data flow manager 120 may contain one or more host modules 215, each handling one or more protocols in communication with one or more storage devices (e.g. one fast storage device and one slow storage device). Data-aware data flow manager 120 may determine whether to pipe the data to the fast or slow storage device based on data patterns, attributes related to content or application, user or system policies, or other factors.

Figure 3:
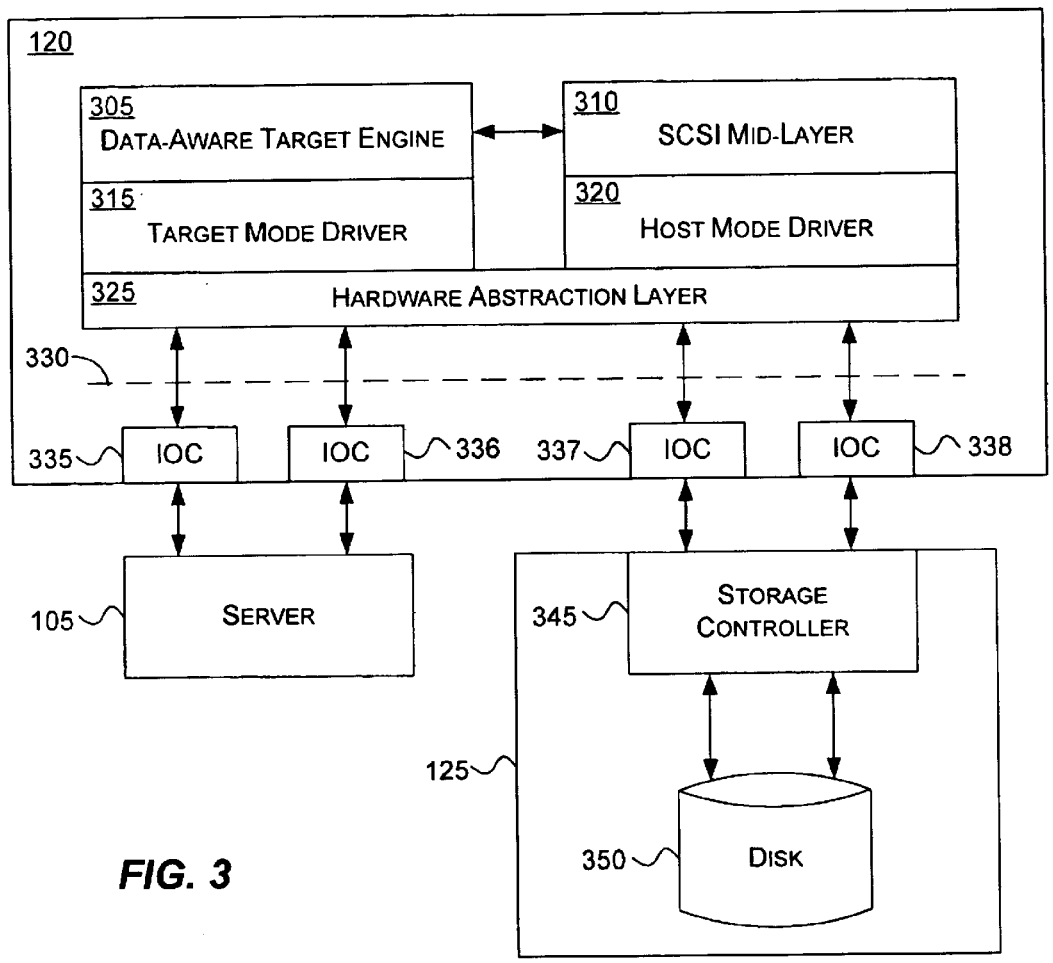
FIG. 3 is a block diagram representing a more detailed view of an exemplary environment in which the invention may be practiced in accordance with some aspects of the invention.

FIG. 3 is a block diagram representing an exemplary environment in which the invention may be practiced in accordance with some aspects of the invention. The environment includes a data-aware data flow manager 120, data-aware target engine 305, SCSI mid-layer 310, target mode driver 315, host mode driver 320, hardware abstraction layer (HAL) 325, input/output controllers (IOCs) 335–338, server 105, storage controller 345, and disk 350.

Data-aware target engine 305 includes a SCSI target engine (STE) (not shown). The STE may bridge data sent to it between target mode driver 315 and host mode driver 320. This may allow, for example, for data to be transferred from server 105, to disk 350. The STE may also be used by data-aware target engine 305 to send or receive data from a device or process external to data-aware target engine 305. Generally, an STE comprises a data pipe engine that transfers data between two devices. The data pipe engine may use SCSI protocols or other common communication protocols.

Data-aware target engine 305 uses SCSI mid-layer 310 to send data and commands to and receive data and responses from disk 350. These data and commands may be relayed through other processes, components, or devices, such as host mode driver 320, one or more of IOCs 335–338, and storage controller 345. Generally, data-aware target engine 305 can communicate data and commands to other processes, components, or devices, such as host mode driver 320, and other downstream devices.

HAL 325 provides an interface to send data to and receive data from hardware, such as IOCs 335–338. HAL 325 may be structured to provide a certain set of interfaces to software, regardless of the capabilities of the hardware. HAL 325 may be modified to work with different hardware or different low level communication protocols while maintaining the same set of software interfaces. Thus, a software program interacting with HAL 325 can be ported to other hardware platforms or communication protocols without requiring that the software program be rewritten. Instead, a HAL that presents the same software interface can be constructed for the other hardware platforms or communication protocols.

Dotted line 330 shows an exemplary separation between software and hardware within data-aware data flow manager 120 with components below the line being implemented in hardware and components about the line being implemented in software. It will be recognized, however, that any components within data-aware data flow manager 120 may be implemented in hardware, in software, or in some combination thereof without departing from the spirit or scope of the invention.

IOCs 335–338 send data or commands to and receive data or commands through communication links attached to IOCs 335–338. The communication links may be implemented in any technology now existing or hereafter invented without departing from the spirit or scope of the present invention. Some current communication link technologies include Ethernet, fiber channel, SCSI, SCSI, InfiniBand, EIDI, USB, Firewire, and the like.

Target mode driver 315 receives commands and data from server 105. Target mode driver 315 may include what is typically found on a storage controller, such as storage controller 345. As data-aware data flow manager 120 may sit between a server and a storage controller, target mode driver 315 may emulate the behavior of a storage controller when accessed by a server. Data-aware data flow manager 120 may also emulate the behavior or a server (e.g., via host mode driver 320) when communicating with storage controller 345. Thus, server 105 will not typically know that it is communicating with data-aware data flow manager 120; rather, it will think that it is communicating with a storage device. Similarly, storage controller 345 will not typically know that it is communicating with data-aware data flow manager 120; rather, it will think that it is communicating with a server. Generally, a target mode driver, such as target mode driver 315, does not initiate a conversation. Rather, the target mode driver responds to a conversation and then controls and finishes the conversation.

Host mode driver 320 sends data and commands received from SCSI mid-layer 310 to one or more of IOCs 337–338. Host mode driver 320 does this through HAL 325. The HAL selects one or more of the IOCs through which to send the commands or data. The selected IOCs send the commands or data to storage controller 345. Storage controller 345 may then save the data on disk 350 or perform the command. A command may include retrieving data from disk 350, for example. HAL 325 receives data through one of IOCs 337–338. This data is sent from storage controller 345. HAL 325 relays this data to host mode driver 320. Host mode driver 320 may make data-aware data flow manager 120 appear to be a server to storage controller 345. Typically, a host mode driver initiates a conversation to send data or commands.

Storage controller 345 manages, controls, and provides access to disk 350. Storage controller 345 typically includes its own host mode driver and target mode driver (not shown).

Disk 350 includes any computer storage medium readable or writable by a computing device. Computer storage media can include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device. Disk 350 may include one or more computer storage medium devices.

Figure 4:
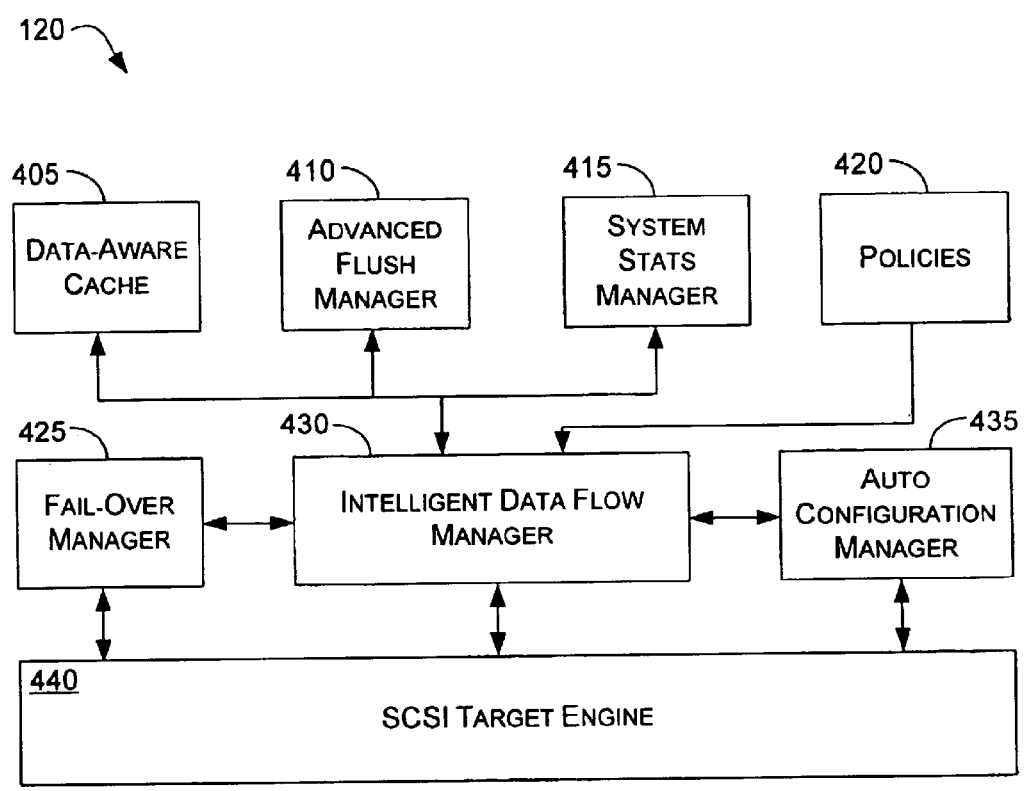
FIG. 4 is a block diagram representing exemplary components of a data-aware data flow manager in accordance with some aspects of the invention.

FIG. 4 is a block diagram representing exemplary components of a data-aware data flow manager in accordance with some aspects of the invention. The components include data-aware cache 405, advanced flush manager 410, system stats manager 415, policies 420, fail-over manager 425, auto configuration manager 435, and SCSI target engine 440. It will be recognized, however, that not all of the components described in conjunction with FIG. 4 are essential to every decision data-aware data flow manager 120 makes. Indeed, data-aware data flow manager 120 may make many of its decisions based on information from zero, one, or more of the components without departing from the spirit or scope of the invention. Various embodiments of data-aware data flow manager 120 may include fewer than all the components shown in FIG. 4. In addition, components may be split or merged, or implemented in hardware, in software, or in some combination thereof without departing from the spirit or scope of the invention.

Fail-over manager 425 detects certain condition events that indicate a failure. At least three types of failures may occur. In one type of failure, the device upon which intelligent data flow manager 430 resides may crash, become totally disconnected from servers and storage, or otherwise become incapable of responding to or forwarding data. In a second type of failure, the device upon which intelligent data flow manager 430 resides may lose one or more connections to a server or storage while maintaining at least one other connection to the server or storage. In a third type of failure, the device upon which intelligent data flow manager 430 resides may lose all connections to a server or storage. The first type of failure is known as a complete failure while the other types of failure are known as a partial failure.

Upon detection of a failure, fail-over manager 425, notifies intelligent data flow manager 430 of the failure. Intelligent data flow manager 430 may then reconfigure or otherwise deal with the failure. For example, in response to a complete failure, intelligent data flow manager 430 may inform another redundant intelligent data flow manager (hereinafter sometimes referred to as "neighbor") (not shown) that the other intelligent data flow manager should take over the duties of intelligent data flow manager 430. In case intelligent data flow manager 430 is unable to inform the other redundant intelligent data flow manager to take over the intelligent data flow manager 430's duties (e.g., if there is a power outage to the device upon which intelligent data flow manager 430 resides), the redundant intelligent data flow manager may deduce that the intelligent data flow manager 430 has suffered a complete failure and may automatically take over the intelligent data flow manager 430's functions. This may be detected if the intelligent data flow manager 430 ceases sending "I'm alive" or "heartbeat" messages to the other redundant intelligent data flow manager.

If one or more connections to a server or storage fail, intelligent data flow manager 430 may reroute traffic to the server or storage through the one or more remaining connections to the server or storage. For example, fail-over manager 425 may indicate that one of IOCs (e.g., one of IOCs 335–338) has failed. Intelligent data flow manager 430 may then route communications over a non-failing IOC.

If all of the connections to a server or storage fail, intelligent data flow manager 430 may use the paths of a redundant intelligent data flow manager (not shown) to access the server or storage. In addition, intelligent data flow manager 430 may provide a path to a server or storage for a redundant intelligent data flow manager that has lost one or more paths to the server or storage. For example, a neighboring intelligent data flow manager may indicate that it no longer has a path to a server or to storage. Intelligent data flow manager 430 may have a path to the server or the storage. Intelligent data flow manager 430 may pass data or commands to and from the other intelligent data flow manager through intelligent data flow manager 430's path.

Fail-over manager 425 may inform intelligent data flow manager 430 of an impending failure. For example, a power outage may activate an uninterruptible power supply (UPS). The UPS may be able to supply power for a limited amount of time. Fail-over manager 425 may indicate a pending complete failure to intelligent data flow manager 430. In response, intelligent data flow manager 430 may attempt to flush everything from cache (e.g., by informing advanced flush manager 410 of the pending shutdown). If necessary (e.g., if the time left before shutdown has reached a critical threshold), intelligent data flow manager 430 may direct that the cache be dumped into a local non-volatile memory. The local non-volatile memory may then be used to restore the cache when the device upon which the intelligent data flow manager 430 resides is brought back up.

In response to a pending complete failure, intelligent data flow manager 430 may stop assigning data to cache. For example, if a server is still trying to read or write data, intelligent data flow manager 430 may cease caching this data.

Fail-over manager 430 may be in charge of mirroring cache between intelligent data flow manager 430 and a redundant device.

Policies 420 include any user input which intelligent data flow manager 430 uses or may use in its decision-making process. In general, policies 420 take priority over other system preferences. Policies 420 may affect how intelligent data flow manager 430 caches data sent to or retrieved from certain storage volumes. For example, a policy may apply to data written to or retrieved from a storage identified by one logical unit number (LUN), but not to data written to or retrieved from storage identified by another LUN. A LUN identifies a virtual storage device that may span one, less than one, or more than one actual physical storage devices. Policies 420 may be applied on volume-by-volume basis or cache-by-cache basis. Policies 420 may be arranged hierarchically, wherein a policy that applies to a single cache or volume may take precedence over a policy that applies to a group of caches or volumes (or vice-versa).

A policy may indicate whether one or more threads should be used by intelligent data flow manager 430. A policy may indicate how cache should be mirrored on a redundant intelligent data flow manager. A policy may indicate that dynamic multi-pathing should or should not be used. Multi-pathing means that a device has two or more paths by which it can transfer data to or from another device. A policy may indicate a mapping from a volume to a particular cache.

One or more policies may affect the sizes of reads or writes that are sent to disk. For example, a policy may indicate what a preferred size for writing is. Writes may be cached until the preferred size is reached before being sent to disk. A policy may limit the size of a write to disk (e.g., to 128 kilobytes or some other number).

One or more policies may affect prefetching. A policy may indicate that prefetching should or should not be done. A policy may indicate that when a relatively large number of reads are being requested that additional data be prefetched in anticipation of a future read. A policy may indicate that when data reads show a pattern (e.g., sequential), that a selected amount of data is prefetched in anticipation of another sequential read. A policy may indicate that when a read is requested that more data than the read requested be retrieved from storage in the same request that is sent to the storage.

One or more policies may affect what data is cached and under what conditions. For example, a policy may indicate there should be no write-back caching, that only reads should be cached and not writes, or that only writes should be cached and not reads. A policy may indicate that a certain volume should have a cache equal or greater in size than the volume. This may allow, for example, the data in the volume to be completely stored in the cache. A policy may indicate that intelligent data flow manager 430 should not cache data written to a certain LUN. A policy may indicate that when the stress of a cache exceeds a certain threshold, that the cache should be bypassed for certain types of data accesses (e.g., large reads or writes).

One or more policies may be related to flushing cache entries. A policy may indicate that a cache entry may only remain in cache for a certain length of time before the cache entry should be written to a non-volatile storage. A policy may indicate that a portion or all of the cache entries should be flushed on a particular schedule. A policy may indicate how aggressively flushing should be performed. For example, in the case of an imminent complete failure (e.g., the system has lost power and is operating using the power generated by a UPS), policies may indicate the degree to which new items are placed (or not placed) in cache, how much bandwidth to storage is reserved for flushing to remote storage (as compared to how much bandwidth may be used to pass data to and from a server), when to flush to a local disk, and the like. A policy may indicate the priority with which flushing should be done (e.g., CPU bandwidth, network bandwidth, and the like). A policy may indicate the amount of flushing that should be done during a relatively idle time. A policy may indicate the level of flushing that should occur when a threshold is exceeded for dirty cache. A policy may indicate when cache should be bypassed (e.g., when dirty lines exceed a threshold, when the rate of write requests begins to degrade performance if the data associated with the write requests is cached, or when flushes are not keeping up with writes). A policy may indicate which paths (e.g., in a multi-path system) may be used to flush. Each policy may be related to one or more caches.

A policy may indicate a level of logging. For example, one level of logging may be to log detailed data regarding all traffic. Another level of logging may be to log data regarding traffic to and from a certain volume. Another level of logging may be to log aggregate data collected about traffic.

A policy may indicate a sequence for recovering after a complete or partial failure. For example, if a cache was dumped to a local disk, the policy might indicate that the cache should be flushed to storage before any reads or writes from a server are processed. Alternatively, if the cache were dumped to a local disk, the policy might indicate that intelligent data flow manager 430 can service host requests after recovering the cache from the local disk.

A policy may indicate how upgrading should be done. For example, when intelligent data flow manager 430 has a redundant counterpart, a policy may indicate which intelligent data flow manager is primary and which is secondary. A policy may indicate how automatically upgrading should be done. In one embodiment, a policy indicates that a user should have more control over the upgrade process. A user may want to upgrade one of a pair of redundant intelligent data flow managers and then wait a while before upgrading the other redundant intelligent data flow manager. In another embodiment, a policy may indicate that after the upgrade an upgraded intelligent data flow manager automatically should automatically obtain configuration data from the un-upgraded intelligent data flow manager.

A policy may indicate that cache should be dumped to a local storage periodically. The policy may also indicate what period should be used in dumping the cache to the local storage.

One or more policies may affect what happens when a neighbor fails. For example, a policy may indicate that an intelligent data flow manager check more than just a "heart beat" to determine whether its neighbor has failed. For example, a policy may indicate that an intelligent data flow manager should check a special portion on a disk to determine whether its neighbor is still operating.

Policies in policies 420 may be added or modified through a user interface, a file, through SNMP (Simple Network Management Protocol), or some other mechanism without departing from the spirit or scope of the invention. Generally, a policy remains in effect until changed. It will be recognized that policies allow a mechanism for customizing an intelligent data flow manager's behavior for a particular product, manufacturer, or customer.

Intelligent data flow manager 430 may dynamically switch or override some policies based on cache statistics, data pattern, or other factors. For example, a policy may indicate that dirty data should be flushed periodically. However, upon detecting the system is under stress in handling server requests, intelligent data flow manager 430 may suspend flushing until the system is less busy.

As data flows into intelligent data flow manager 430, it determines whether to place the data into data-aware cache 405. Data-aware cache 405 may determine how it replaces cache lines and what caching methodology it uses based on data usage patterns and the state of cache. If data-aware cache 405 determines that it needs to have one or more cache lines flushed, it informs intelligent data flow manager 430. Intelligent data flow manager 430 may then inform advanced flush manager 410 of the need to flush the one or more cache lines. In response to the information, intelligent data flow manager 430 may determine to flush other lines in anticipation of future need. The threshold of when to flush other lines may be set by policy. How aggressively other lines should be flushed may also be set by policy or other factors.

Data-aware cache 405 may also send other information to intelligent data flow manager 430. Data-aware cache 405 may indicate 1) that there is not enough space in cache to cache the data; 2) hit/miss information related to the cache; 3) stress condition of the cache; or 4) information related to dirty lines in the cache. If data-aware cache 405 indicates that there is not enough space in the cache to cache the data, intelligent data flow manager 430 may determine to bypass storing the data in data-aware cache 405 and may instead send the data directly to a target or targets of the data (e.g., a server or one or more storage devices).

Data-aware cache 405 may indicate information regarding hit/miss performance of the cache including whether the request generates a hit, partial hit, or miss. A partial hit occurs when some but not all of the data that is requested to be read or written is contained within the cache. For example, a server may request a number of blocks of data. Part of the data may be found in data-aware cache 405, while another part of the data might not exist in data-aware cache 405. Upon receipt of this information, intelligent data flow manager 430 may forward the information (or a pointer thereto) to system stats manager 415 which may then update its statistics. Intelligent data flow manager 430 may also forward other information to system stats manager 415 including size of read or write, associated LUN or LUNs, and the like.

Data-aware cache 405 may inform intelligent data flow manager 430 of data-aware cache 405's stress. Stress may include how much cache is free, if the data-aware cache 405 has enough cache free to service the request, or the extent to which the cache is dirty.

Data-aware cache 405 may inform intelligent data flow manager 430 regarding dirty lines including how many dirty lines of cache there are, whether the number of dirty lines has reached a threshold, whether a flush is needed, and the like. Intelligent data flow manager 430 may determine, based on this information, to bypass cache, take flushing measures (e.g., flush a certain number of dirty lines to disk), or take other action. Intelligent data flow manager 430, data-aware cache 405, fail-over manager 425, or some other component may synchronize cache with a redundant intelligent data flow manager (not shown).

Advanced flush manager 410 manages the pace and sets up the details of the flush. Intelligent data flow manager 430 informs advanced flush manager 410 when to flush and from which cache flush to which storage device. Advanced flush manager 410 may also store statistics regarding flushes, such as how big a flush is, how many items have been flushed, and the like. Advanced flush manager 410 may communicate with one or more caches. Each cache may be mapped to one or more LUNs. Advanced flush manager 410 may be connected to local storage and can dump cache to the local storage upon command.

System stats manager 415 may collect information associated with the traffic flowing through the system or information associated the system upon which intelligent data flow manager 430 operates. Information associated with the data flowing through the system includes caching information (e.g., hits, misses, utilization, clean, dirty, and the like), how much data passes through the cache, how much data bypasses the cache, the size of the reads and the writes, or the sequential or non-sequential nature of the data. Information associated with the system upon which intelligent data flow manager 430 operates includes data associated with the software and hardware. Software includes the operating system or any other software executing on the system. Hardware may include CPU, IOCs, RAM, ROM, buses, mass memory storage, type, speed and utilization of communication links or any other hardware included in the system.

The information collected by system stats manager 415 regarding traffic may be grouped by a LUN or a portion thereof. This may be done, for example, to detect a LUN's utilization and migrate data on the LUN to a less busy LUN or LUNs if needed.

What data system stats manager 415 collects may be determined by one or more policies. For example, based on a policy, system stats manager 415 may be instructed to monitor the bandwidth utilization of one or more links associated with one or more of the IOCs (not shown). System stats manager 415 may be further instructed to notify intelligent data flow manager 430 when a bandwidth utilized across the link or links exceeds a threshold. When the bandwidth exceeds the threshold, another path may be sought (if available) over which to send data.

In some embodiments of the invention, intelligent data flow manager 430 queries system stats manager 415 to obtain information of interest. In other embodiments of the invention, system stats manager 415 notifies intelligent data flow manager 430 when it detects certain conditions.

System stats manager 415 may collect data from (or receive data associated with) data-aware cache 405, such as hits, misses, or any other data data-aware cache 405 generates. System stats manager 415 may collect utilization information regarding hardware associated with intelligent data flow manager 430 (e.g., CPU, network, bus, ports, and memory utilization).

System stats manager 415 may keep history and enable intelligent data flow manager 430 to determine whether data accesses to a LUN are sequential in nature or not. Data accesses that are sequential may indicate data that should not be cached (e.g., a video stream). Other data that may be collected include the number of each read and write and the sizes of the data read or written.

The size of the cache allocated for dirty and clean lines may be dynamically changed based on information collected by system stats manager 415. For example, if data collect indicates an unusual ratio of reads verses writes, the cache allocated for dirty and clean lines may be adjusted accordingly.

Auto configuration manager 435 includes a set of system preferences that indicate the defaults for setting up the various components of the system shown in FIGS. 3 and 4. These system preferences may be thought of as "default policies." A system preference may apply until a user defines an overriding policy or intelligent data flow manager 430 switches the policy on the fly.

Auto configuration manager 435 may include predefined policies that are burned into a ROM or some other non-volatile memory. A policy in policies 420, however, will generally take precedence over a policy found in auto configuration manager 435.

Auto configuration manager 435 attempts to determine which IOCs are connected to servers and which IOCs are connected to storage. If auto configuration manager 435 detects a server connected to an IOC, auto configuration manager 435 may attempt to initialize a target mode driver to communicate with the server. If auto configuration manager 435 detects a storage device connected to an IOC, auto configuration manager 435 may attempt to initialize a host mode driver to communicate with the storage device.

Auto configuration manager 435 may determine how much memory is available for caching and may divide (or cause to be divided) the memory among cache used to mirror a neighbor's cache, cache used to cache reads, and cache used to cache writes accordingly.

Auto configuration manager 435 may try to determine whether a redundant intelligent data flow manager exists. If auto configuration manager 435 detects a neighbor, auto configuration manager 435 may then communicate with the neighbor. In this communication, auto configuration manager 435 may determine, for example, whether the system auto configuration manager 435 is operating on is recovering from a crash. If so, auto configuration manager 435 may obtain configuration information from the neighbor. Auto configuration manager 435 may also query the neighbor for its configuration. The neighbor's configuration may be used, for example, to determine an alternate path to a server or storage or to restore the neighbor's configuration should the neighbor crash.

In situations in which intelligent data flow manager 430 has more than one path, intelligent data flow manager 430 may choose a path depending on the data requested or quality of service expected.

Figure 5:
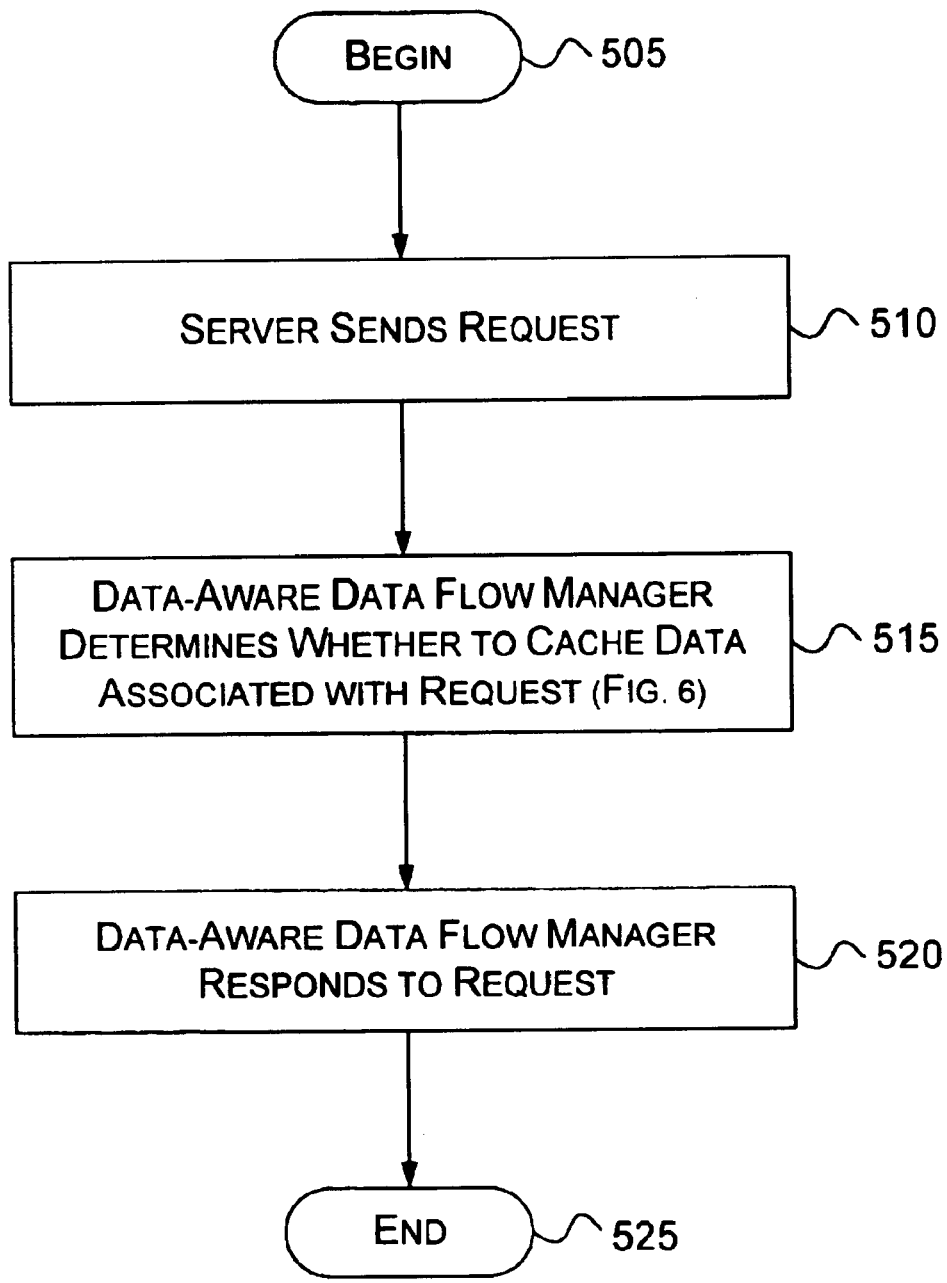
FIG. 5 is a dataflow diagram that generally represents exemplary steps that may occur in an environment that operates in accordance with some aspects of the invention.

FIG. 5 is a dataflow diagram that generally represents exemplary steps that may occur in an environment that operates in accordance with some aspects of the invention. The process begins at block 505.

At block 510, a server sends a request. The request is received by a data-aware data flow manager. The request may include a command or a request to read data from or write data to storage.

At block 515, the data-aware data flow manager determines whether to cache data associated with the request. A process of determining whether to cache data associated with the request is described in more detail in conjunction with FIG. 6.

At block 520, the data-aware data flow manager responds to the request. If data was requested, the data is returned. If a request to write data was received, the data may be cached or not cached, written to an external storage device or not written to an external storage device, depending on policies, system preferences, and the state of the DADFM.

At block 525, processing ends. The process described above may be repeated each time a request is sent from a server.

Figure 6:
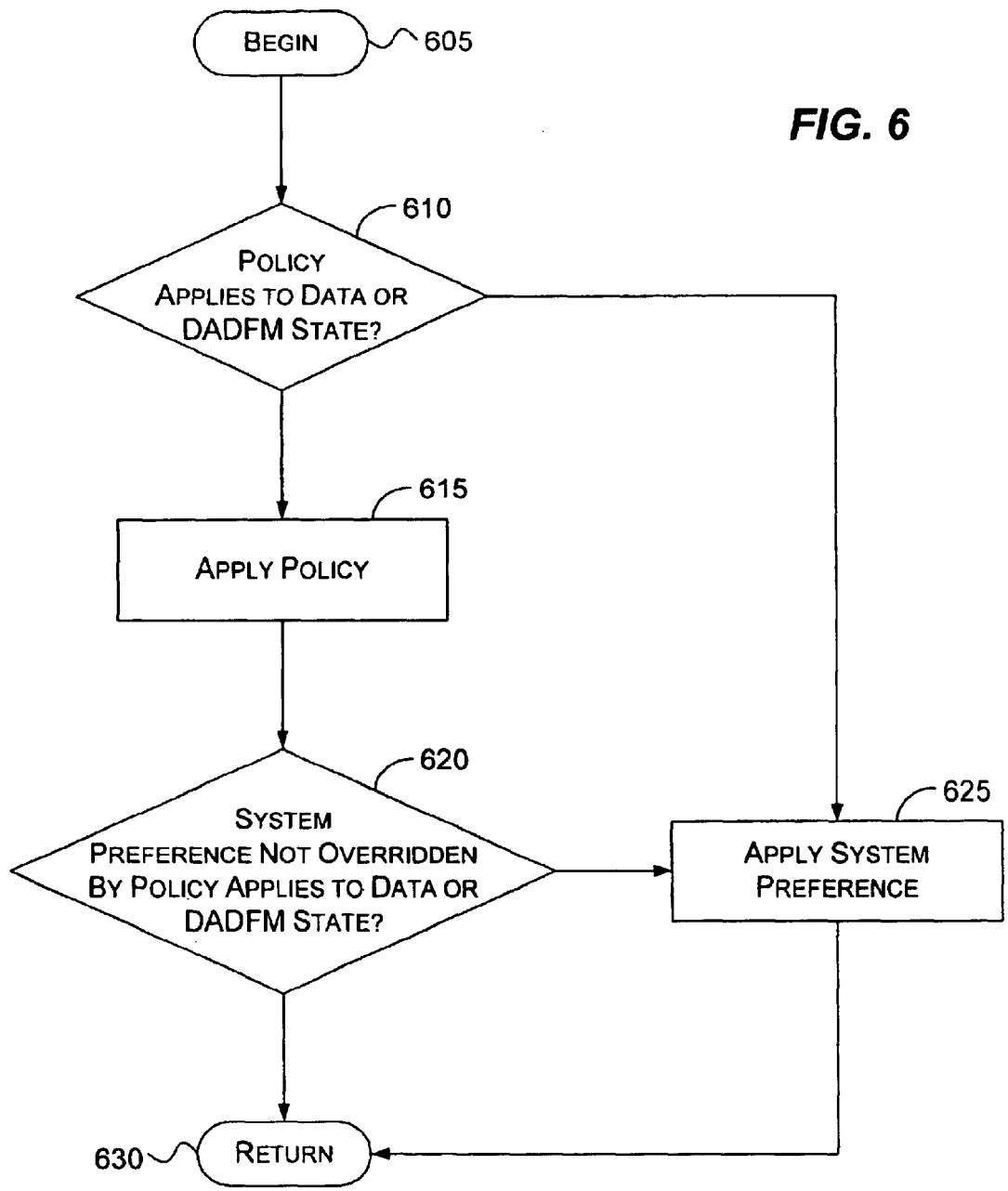
FIG. 6 is a dataflow diagram that generally represents exemplary steps that may occur to determine whether to cache or not cache data.

FIG. 6 is a dataflow diagram that generally represents exemplary steps that may occur to determine whether to cache or not cache data. The steps of FIG. 6 correspond to block 515 of FIG. 5. The process begins at block 605.

At block 610, a determination is made as to whether a policy applies to the data or to the DADFM's state. If a policy applies, processing continues at block 615; otherwise, processing continues at block 625.

At block 615, the applicable policy or policies are applied. For example, a policy may indicate that there should be no write-back caching of data. If while this policy was under effect a server requested that data be stored, the data would be sent to storage according to the policy. DADFM state in conjunction with the data may indicate that because of cache stress or otherwise that other data should be flushed to the storage with the data that is currently being sent, for example.

At block 620, a determination is made as to whether any system preferences that have not been overwritten by policy apply to the data or DADFM state. If so, processing continues at block 625; otherwise processing continues at block 630.

At block 625, system preferences are applied to the request sent by the server. For example, system preferences may indicate that non-sequential data should be stored in cache when the cache is not under stress. Provided that this system preference is not overridden by a policy (e.g., that there should be no write-back caching), data for a request for non-sequential data would be cached.

The process returns at block 630.

Figure 7:
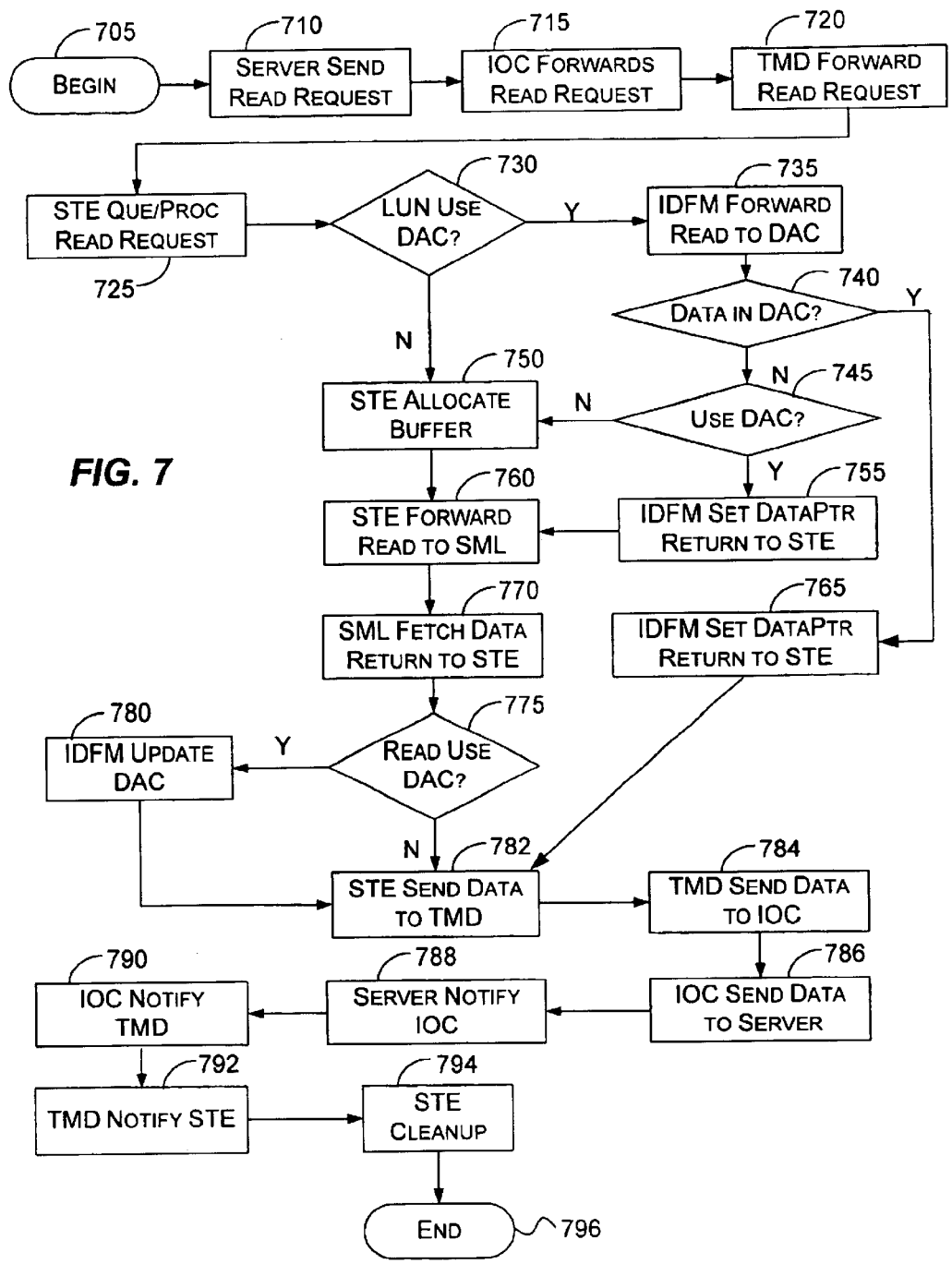
FIG. 7 is a dataflow diagram that generally represents exemplary steps that may occur when a server sends a read request in accordance with some aspects of the invention.

FIG. 7 is a dataflow diagram that generally represents exemplary steps that may occur when a server sends a read request in accordance with some aspects of the invention. The process begins at block 705. At block 710, the server sends a read request. At block 715, the IOC that receives the read request forwards the read request to a target mode driver. At block 720, the target mode driver forwards the request to a SCSI target engine (STE). At block 725, the STE queues the request.

At block 730, a determination is made as to whether the LUN to which the read request is destined is cached. If not, processing continues at block 750; otherwise, processing continues at block 735. At block 735, the IDFM forwards the read to a data-aware cache. At block 740, if the data is in the data-aware cache (DAC), processing branches to block 765; otherwise, processing branches to block 745. At block 765, a data pointer (or a set of data pointers in a scatter gather list) is set to point at the data in the cache. At block 745, the IDFM further decides whether to use the DAC or not based on data access characteristics, state of cache, or other factors. If the decision is yes, processing branches to block 755; otherwise, processing branches to block 750. The branch to block 750 is useful in certain conditions. For example, if the cache is under stress and dirty lines have to be flushed before freeing up cache lines for the read request (e.g., read induced write and read wait on write), then bypassing cache may shorten the latency and the response time to the read request. At block 755, a data pointer (or a set of data pointers in a scatter gather list) is set to point to one or more free cache lines that have been assigned to receive the data from the read request.

At block 750, the STE allocates a buffer. At block 760, the STE forwards the read to the SCSI Mid-Layer (SML). At block 770, the SML fetches the data to return to the STE. At block 775, a determination is made as to whether the read has been set up to use cache or a buffer. If so, processing branches to block 780; otherwise, processing branches to block 782. At block 780, the IDFM updates the data-aware cache state. At block 782, the STE sends data to the target mode driver (TMD). At block 784 the TMD sends the data to the IOC. At block 786, the IOC sends data to the server. At bock 788, the server notifies the IOC that it has received the data. At block 790, the IOC notifies the TMD that the data was received. At block 792, the TMD notifies the STE that the data has been received. At block 794, the STE initiates de-queue and cleanup. At block 796, the process ends.

The steps illustrated in FIG. 7 may be used by devices that use SCSI to communicate between a server and the IDFM and between the IDFM and a storage device. It will be recognized that other steps may be used for devices that use another protocol to communicate between the server and the IDFM without departing from the spirit or scope of the invention.

Figure 8:
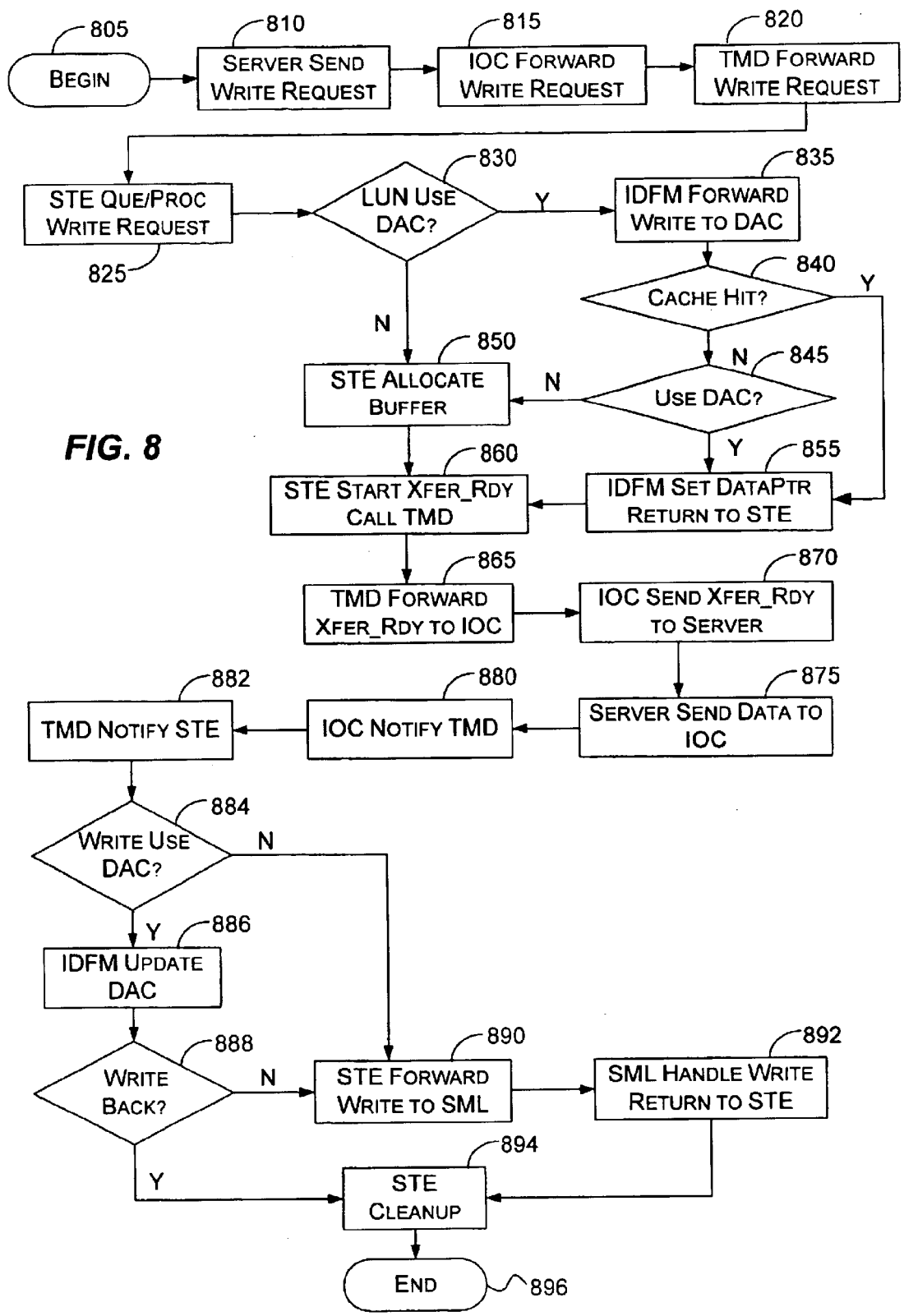
FIG. 8 is a dataflow diagram that generally represents exemplary steps that may occur when a server sends a write request in accordance with some aspects of the invention.

FIG. 8 is a dataflow diagram that generally represents exemplary steps that may occur when a server sends a write request in accordance with some aspects of the invention. The process begins at block 805. At block 810, the server sends a write request. At block 815, the IOC that receives the write request forwards the write request to a target mode driver. At block 820, the target mode driver forwards the request to a SCSI target engine (STE). At block 825, the STE queues the request.

At block 830, a determination is made as to whether the LUN to which the write request is destined is cached. If not, processing continues at block 850; otherwise, processing continues at block 835. At block 835, the IDFM forwards the write to a data-aware cache. At block 840, if a cache hit results, processing branches to block 855; otherwise, processing branches to block 845. At block 845, the IDFM further decides whether to use the DAC or not based on data access characteristics, state of cache, or other factors. If the decision is yes, processing branches to block 855; otherwise, processing branches to block 850.

At block 850, the STE allocates a buffer. The branch to block 850 is useful in certain conditions. For example, if the write data is a large video stream, caching it may force out frequently used data already residing in the cache and negatively impact other applications also using the cache. Furthermore, if the large video stream only remains in the cache temporarily (e.g., data from the video stream are removed from the cache before being requested again), then caching is counterproductive; it adds overhead without gaining any benefit. Typically, caching requested data will improve performance if the cached data is accessed more than once. At block 855, a data pointer (or a set of data pointers in a scatter gather list) is set to point to one or more cache lines that have been assigned to receive the data from the write request.

At block 860, the STE initiates and forwards a Xfer_Rdy message to a target mode driver (TMD). At block 865, the TMD forwards the Xfer_Rdy message to an IOC. At block 870, the IOC sends the Xfer_Rdy message to the server. At block 875, the server sends data to the IOC. At block 880, the IOC notifies the TMD that the write data has arrived. At block 882, the TMD notifies the STE that the write data has been received. At block 884, a determination is made as to whether the write has been set up to use cache or a buffer. If the write uses cache, processing branches to block 886; otherwise, processing branches to block 890. At block 886, the IDFM updates the data-aware cache state.

At block 888, another decision is made as to whether write back or write through should be used. If write through should be used, processing branches to block 890; otherwise, processing branches to block 894. At block 890, the STE forwards the write request with data to the SCSI Mid-Layer (SML). At block 892, the SML handles the write request and notifies the STE when the data is written to physical storage. At block 894, the STE initiates de-queue and cleanup. At block 896, the process ends.

The steps illustrated in FIG. 8 may be used by devices that use SCSI to communicate between a server and the IDFM and between the IDFM and a storage device. It will be recognized that other steps may be used for devices that use another protocol to communicate between the server and the IDFM without departing from the spirit or scope of the invention.

Figure 9:
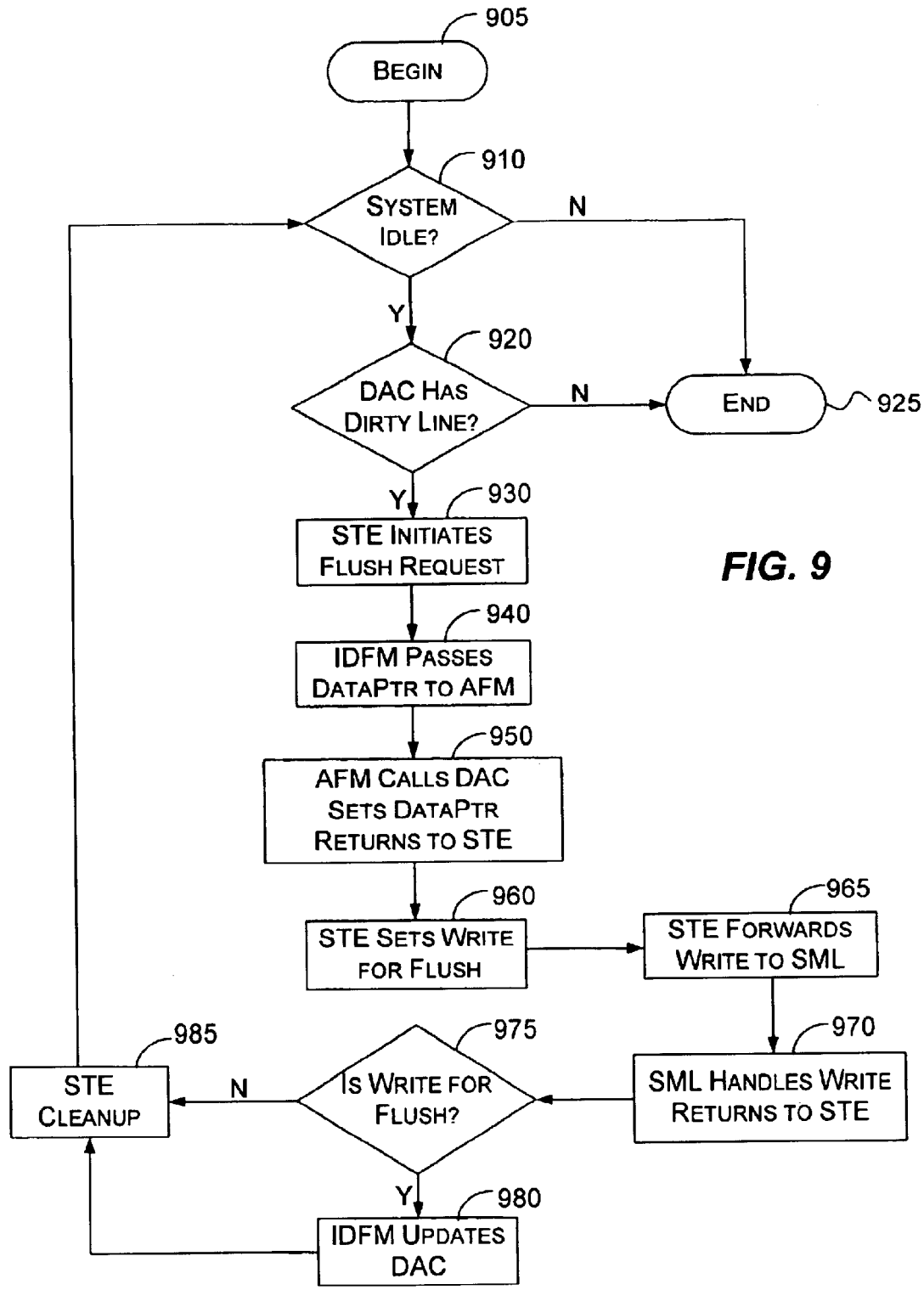
FIG. 9 is a dataflow diagram that generally represents exemplary steps that may occur when data-aware data flow manager initiates and handles a flush request in accordance with some aspects of the invention.

FIG. 9 is a dataflow diagram that generally represents exemplary steps that may occur when a data-aware data flow manager initiates and manages the flush of dirty lines in the data-aware cache in accordance with some aspects of the invention. The process begins at block 905. At block 910, the DADFM makes a decision as to whether the system is idle. If not, processing branches to block 925 where the flush process terminates. Otherwise, processing branches to block 920. At block 920, a determination is made as to whether the data-aware cache (DAC) needs to be flushed. This may be done by an IDFM, for example. If not, processing branches to block 925 where the flush process terminates. Otherwise, the processing branches to block 930.

At block 930, the STE initiates a flush request and queues the request. At block 940, the IDFM passes a data pointer (or a set of data pointers in a scatter gather list) to an advanced flush manager (AFM). At block 950, the AFM calls the data-aware cache, sets the data pointer to the dirty cache line to be flushed, and returns to the STE. Based on cache state and other factors, the AFM may set up data pointers to multiple dirty cache lines for the flush request. This has the effect of combining several small writes into a larger one. At block 960, the STE sets up a write for the flush request. At block 965, the STE forwards the write with dirty data to the SML. At block 970, the SML handles the write for the flush request and notifies the STE when the data is written to physical storage. At block 975, a determination is made as to whether the write is for a flush or is initiated from the server. If the write is for flush, processing branches to block 980; otherwise, processing branches to block 985. At block 980, the IDFM updates the data-aware cache state. At block 985, the STE initiates de-queue and cleanup. Next, the processing goes back to block 910 and repeats.

The steps illustrated in FIG. 9 may be used by devices that use SCSI to communicate between a server and the IDFM and between the IDFM and a storage device. It will be recognized that other steps may be used for devices that use another protocol to communicate between the server and the IDFM without departing from the spirit or scope of the invention.

As can be seen from the foregoing detailed description, there is provided an improved method and system for intelligently directing and caching data flow. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalent falling within the spirit and scope of the invention.

What is claimed is:

1. An apparatus, comprising:
    a target module arranged to communicate with a client requesting access to a storage;
    a host module arranged to communicate with the storage;
    a cache arranged to selectively store data flowing through the apparatus; and
    a control module arranged to determine whether to store data flowing between the client and the storage in the cache and to pipe the data directly between the host module and the target module if the data is not to be cached, wherein the control module is further arranged to access policies including preferred data transfer sizes, mapping of caches to storage or storages, time data can remain in a cache before being flushed, cache line sizes, and cache sizes.

2. The apparatus of claim 1, wherein at least one of the modules comprises a software component.

3. The apparatus of claim 1, wherein at least one of the modules comprises a hardware module.

4. The apparatus of claim 1, wherein the client is a process or component residing on the apparatus.

5. The apparatus of claim 1, wherein the client is a process or component residing on another apparatus.

6. The apparatus of claim 1, wherein the storage spans a portion or all of one or more physical storage media.

7. The apparatus of claim 6, wherein the physical storage media resides on the apparatus.

8. The apparatus of claim 6, wherein the physical storage media resides on one or more devices other than the apparatus.

9. The apparatus of claim 1, wherein the control module uses cache statistics to determine whether to store the data in the cache, the cache statistics including hit/miss ratio, clean/dirty ratio, remaining clean lines, rate of cache fill, and data access frequency.

10. The apparatus of claim 1, wherein the cache mirrors at least a portion of a cache on a redundant apparatus.

11. The apparatus of claim 1, wherein the control module is further arranged to determine a pattern of the data and wherein determining whether to store the data is based on the pattern, a state of the cache, and a policy.

12. The apparatus of claim 1, wherein the control module comprises:
    a flush manager arranged to manage the pace and details of flushing the cache;
    a system statistics manager arranged to collect information associated with the data flowing between the client and the storage, the information including cache hits, misses, and utilization, how much of the data is stored in the cache, how much of the data is piped directly between the host module and the target module, sizes of reads and writes associated with the data, and how sequential the data is.

13. The apparatus of claim 12, wherein the control module further comprises:
    a fail-over manager arranged to communicate with a redundant apparatus to find a path between the client and the storage when the apparatus loses one or more paths to the storage or client or to have the redundant apparatus take over duties of the apparatus should the fail-over manager partially or completely fail; and
    an auto-configuration manager arranged to configure the cache, determine whether a redundant apparatus exists, and configure connections to the client and storage including configuring the target and host modules.

14. A computer-readable medium having computer-executable instructions, comprising:
    receiving a request to access a storage, the request associated with data to be stored on or retrieved from the storage;
    determining whether to cache the data in a cache, wherein determining whether to cache the data in a cache comprises determining whether the request is a request to store data on the storage and, if so, caching the data together with other data associated with other requests until a selectable size of accumulated data has been cached and then writing the accumulated data to the storage;
    if the data is to be cached, caching the data in the cache; and
    if the data is not to be cached, bypassing the cache.

15. The computer-readable medium of claim 14, wherein determining whether to cache the data in a cache comprises determining whether a failure is pending and if so, bypassing the cache.

16. The computer-readable medium of claim 14, wherein the storage is associated with a policy that indicates that data associated with the storage should not be cached and wherein determining whether to cache the data in the cache applies the policy.

17. The computer-readable medium of claim 14, wherein determining whether to cache the data comprises applying a policy that has different effects depending on whether the request is to store data on or retrieve data from the storage.

18. The computer-readable medium of claim 14, wherein a policy indicates that there should be no write-back caching and wherein determining whether to cache the data in a cache applies die policy, such that the cache is bypassed on requests to write to the storage.

19. The computer-readable medium of claim 14, wherein determining whether to cache the data comprises applying a policy that indicates that the cache should be bypassed for reads or writes exceeding a certain size.

20. The computer-readable medium of claim 14, wherein determining whether to cache the data is based on a stress associated with the cache.

21. The computer-readable medium of claim 20, wherein the cache includes a number of dirty lines and the stress is calculated based on whether the number of dirty lines in the cache exceeds a threshold, whether a flush is required to cache the data, and whether flushes from the cache are keeping up with writes to the cache.

22. The computer-readable medium of claim 14, wherein determining whether to cache the data is based on whether the cache is recovering after a failure.

23. The computer-readable medium of claim 14, further comprising storage the cache on a local non-volatile memory in anticipation of a system failure.

24. The computer-readable medium of claim 14, further comprising collecting information including hit/miss performance, dirty lines in the cache, stress conditions of the cache, space available in the cache to store any data, utilization of the cache, sizes of reads and writes, how sequential or non-sequential requested data is, information associated with an operating system on a system upon which the cache resides, information associated with hardware of the system upon which the cache resides.

25. The computer-readable medium of claim 24, wherein the cache has an allocated number of clean and dirty lines and further comprising dynamically adjusting the number of clean and dirty lines based on a ratio of reads verses writes to the storage.

26. The computer-readable medium of claim 14, further comprising flushing the cache when a bandwidth utilized to the storage is below a threshold.

27. A computer-readable medium having computer-executable components, comprising:
  a target component arranged to receive a request to access a storage;
  a host component arranged to communicate with the storage;
  a control component arranged to determine whether to store data associated with the request in a cache and to pipe the data directly between the host component and the target component if the data is not to be cached;
  a flush component arranged to manage pace and details of flushing the cache;
  a system statistics component arranged to collect information associated with the data, the information including cache hits, misses, and utilization, how much of the data is stored in the cache, how much of the data is piped directly between the host component and the target component, sizes of reads and writes associated with the data, and how sequential the data is.

28. An apparatus, comprising:
  a target module arranged to communicate with a client requesting access to a storage;
  a host module arranged to communicate with the storage;
  a cache arranged to selectively store data flowing through the apparatus; and
  means for determining whether to store data flowing between the client and the storage in the cache and to pipe the data directly between the host module and the target module if the data is not to be cached, wherein the means is arranged to evaluate cache statistics to determine whether to store the data in the cache or to pine the data directly between the host module and the target module, the cache statistics including hit/miss ratio, clean/dirty ratio, remaining clean lines, rate of cache fill, and data access frequency.

* * * * *